(12) United States Patent
Eck

(10) Patent No.: US 9,299,042 B2
(45) Date of Patent: Mar. 29, 2016

(54) PREDICTING EDGES IN TEMPORAL NETWORK GRAPHS DESCRIBED BY NEAR-BIPARTITE DATA SETS

(71) Applicant: Raytheon Company, Waltham, MA (US)

(72) Inventor: Christopher R. Eck, Dunedin, FL (US)

(73) Assignee: Raytheon Company, Waltham, MA (US)

( * ) Notice: Subject to any disclaimer, the term of this patent is extended or adjusted under 35 U.S.C. 154(b) by 287 days.

(21) Appl. No.: 13/963,439

(22) Filed: Aug. 9, 2013

(65) Prior Publication Data

US 2015/0046384 A1 Feb. 12, 2015

(51) Int. Cl.
*G06N 5/04* (2006.01)
*G06F 17/18* (2006.01)
*G06Q 10/06* (2012.01)

(52) U.S. Cl.
CPC ............... *G06Q 10/06* (2013.01); *G06F 17/18* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 2008/0027890 A1* | 1/2008 | Chickering et al. | 706/52 |
| 2013/0246020 A1* | 9/2013 | Zeng | 703/2 |
| 2014/0108994 A1* | 4/2014 | Medlock et al. | 715/773 |
| 2014/0317033 A1* | 10/2014 | Mojsilovic et al. | 706/17 |
| 2014/0317038 A1* | 10/2014 | Mojsilovic et al. | 706/46 |

OTHER PUBLICATIONS

Cheng et al, Prediction of Drug-Target Interactions and Drug Repositioning via Network-Based Inference, 2012.*
Mankoff et al, Providing Integrated Toolkit-Level Support for Ambiguity in Recognition-Based Interfaces, 2000.*

* cited by examiner

*Primary Examiner* — Stanley K Hill
*Assistant Examiner* — Mikayla Chubb
(74) *Attorney, Agent, or Firm* — Schwegman Lundberg & Woessner, P.A.

(57) ABSTRACT

Embodiments of a system and method for predicting a future state of a set of data are generally described herein. In some embodiments, a set of data in a first domain is obtained. The set of data in the first domain may be represented as a network graph. The set of data in the first domain is mapped into a set of data in a second domain. A plurality of prediction models are applied to the set of data in the second domain to produce a plurality of predicted sets of data. The predicted sets of data are combined to generate a combined predicted set of data having a best match. The combined predicted sets of data having the best match are reverse mapped to the first domain.

17 Claims, 10 Drawing Sheets

100

| Crime | | Area 1 | Area 2 | Area 3 | Area 4 | Area 5 | Area 6 | Area 7 | Total |
|---|---|---|---|---|---|---|---|---|---|
| Total Crime | | | | | | | | | |
| | 2011 | 770 | 903 | 310 | 597 | 798 | 712 | 840 | 4930 |
| | 2012 | 850 | 985 | 305 | 560 | 824 | 724 | 890 | 5138 |
| | Δ | 80 | 82 | -5 | -37 | 26 | 12 | 50 | 208 |
| | % | 10.39 | 9.08 | -1.61 | -6.20 | 3.26 | 1.69 | 5.95 | 4.22 |

| Total Property Crime | | Area 1 | Area 2 | Area 3 | Area 4 | Area 5 | Area 6 | Area 7 | Total |
|---|---|---|---|---|---|---|---|---|---|
| | 2011 | 170 | 203 | 110 | 97 | 198 | 112 | 140 | 1030 |
| | 2012 | 250 | 285 | 95 | 60 | 224 | 124 | 190 | 1228 |
| | Δ | 80 | 82 | -15 | -37 | 26 | 12 | 50 | 198 |
| | % | 47.06 | 40.39 | -13.64 | -38.14 | 13.13 | 10.71 | 35.71 | 19.22 |

| Total Violent Crime | | Area 1 | Area 2 | Area 3 | Area 4 | Area 5 | Area 6 | Area 7 | Total |
|---|---|---|---|---|---|---|---|---|---|
| | 2011 | 670 | 703 | 322 | 427 | 508 | 412 | 440 | 3482 |
| | 2012 | 695 | 785 | 305 | 460 | 424 | 524 | 490 | 3683 |
| | Δ | 25 | 82 | -17 | 33 | -84 | 112 | 50 | 201 |
| | % | 3.73 | 11.66 | -5.28 | 7.73 | -16.54 | 27.18 | 11.36 | 5.77 |

| Homicide | | Area 1 | Area 2 | Area 3 | Area 4 | Area 5 | Area 6 | Area 7 | Total |
|---|---|---|---|---|---|---|---|---|---|
| | 2011 | 2 | 3 | 2 | 1 | 1 | 1 | 1 | 11 |
| | 2012 | 2 | 2 | 4 | 1 | 3 | 0 | 1 | 13 |
| | Δ | 0 | -1 | 2 | 0 | 2 | -1 | 0 | 2 |
| | % | 0.00 | -33.33 | 100.00 | 0.00 | 200.00 | -100.00 | 0.00 | 18.18 |

Fig. 1

| | AA | AB | AD | BA | BQ | BM | CM | DA | FQ | KM | MM | MQ | NA | NM | SA | SM | SW | YA | ZA | ZB | ZM |
|---|---|---|---|---|---|---|---|---|---|---|---|---|---|---|---|---|---|---|---|---|---|
| AA | 0 | 2 | 1 | 0 | 2 | 0 | 1 | 2 | 1 | 0 | 1 | 0 | 0 | 0 | 1 | 2 | 0 | 1 | 1 | 0 | 1 |
| AB | 0 | 0 | 1 | 2 | 1 | 1 | 2 | 0 | 1 | 2 | 1 | 0 | 1 | 0 | 0 | 0 | 1 | 2 | 0 | 1 | 1 |
| AD | 2 | 1 | 0 | 2 | 0 | 1 | 2 | 1 | 0 | 1 | 0 | 0 | 1 | 1 | 2 | 0 | 1 | 1 | 0 | 1 | 2 |
| BA | 1 | 0 | 0 | 0 | 0 | 2 | 0 | 1 | 0 | 2 | 0 | 2 | 1 | 0 | 2 | 0 | 1 | 2 | 1 | 0 | 0 |
| BQ | 1 | 0 | 0 | 1 | 1 | 0 | 0 | 1 | 1 | 0 | 1 | 1 | 2 | 1 | 0 | 2 | 0 | 1 | 2 | 1 | 0 |
| BM | 1 | 0 | 1 | 0 | 0 | 2 | 1 | 2 | 0 | 1 | 1 | 0 | 1 | 1 | 0 | 1 | 0 | 2 | 0 | 1 | 2 |
| CM | 0 | 0 | 0 | 1 | 0 | 0 | 1 | 1 | 0 | 1 | 2 | 2 | 1 | 0 | 2 | 0 | 1 | 2 | 1 | 0 | 1 |
| DA | 0 | 2 | 1 | 0 | 2 | 0 | 1 | 1 | 1 | 0 | 0 | 1 | 0 | 0 | 0 | 1 | 2 | 0 | 1 | 0 | 2 |
| FQ | 1 | 0 | 1 | 0 | 2 | 0 | 0 | 2 | 0 | 1 | 1 | 0 | 1 | 1 | 2 | 1 | 0 | 2 | 0 | 1 | 2 |
| KM | 1 | 2 | 1 | 0 | 0 | 1 | 0 | 0 | 1 | 1 | 0 | 1 | 2 | 0 | 1 | 0 | 1 | 0 | 1 | 2 | 0 |
| MM | 0 | 1 | 1 | 0 | 1 | 0 | 2 | 0 | 0 | 1 | 2 | 0 | 0 | 2 | 0 | 0 | 2 | 1 | 2 | 2 | 1 |
| MQ | 0 | 2 | 0 | 2 | 1 | 1 | 2 | 0 | 1 | 2 | 0 | 1 | 0 | 1 | 0 | 0 | 0 | 0 | 2 | 0 | 1 |
| NA | 1 | 0 | 1 | 1 | 2 | 1 | 0 | 2 | 0 | 2 | 1 | 0 | 1 | 0 | 0 | 0 | 0 | 2 | 0 | 0 | 1 |
| NM | 0 | 1 | 1 | 0 | 1 | 1 | 0 | 0 | 2 | 0 | 1 | 0 | 0 | 0 | 0 | 1 | 0 | 2 | 0 | 1 | 2 |
| SA | 0 | 1 | 2 | 2 | 0 | 0 | 1 | 1 | 1 | 0 | 1 | 0 | 2 | 0 | 0 | 1 | 0 | 1 | 1 | 1 | 1 |
| SM | 1 | 0 | 0 | 1 | 1 | 1 | 0 | 0 | 2 | 1 | 0 | 1 | 1 | 2 | 1 | 1 | 0 | 1 | 0 | 2 | 2 |
| SW | 1 | 1 | 0 | 0 | 0 | 0 | 2 | 0 | 0 | 2 | 2 | 0 | 2 | 2 | 1 | 1 | 0 | 0 | 0 | 0 | 2 |
| YA | 1 | 0 | 0 | 1 | 1 | 0 | 0 | 1 | 1 | 0 | 2 | 1 | 1 | 0 | 1 | 0 | 2 | 0 | 2 | 0 | 1 |
| ZA | 1 | 0 | 1 | 0 | 0 | 0 | 1 | 0 | 1 | 2 | 2 | 1 | 1 | 2 | 0 | 1 | 2 | 0 | 1 | 0 | 1 |
| ZB | 2 | 0 | 0 | 0 | 0 | 0 | 0 | 0 | 0 | 0 | 2 | 1 | 1 | 2 | 1 | 0 | 1 | 0 | 1 | 0 | 1 |
| ZM | 1 | 0 | 1 | 1 | 2 | 0 | 1 | 0 | 2 | 0 | 1 | 1 | 0 | 2 | 0 | 1 | 2 | 1 | 0 | 1 | 0 |

| Method | Avg. Error vs Truth (Δ Crimes) |
|---|---|
| CAPPING | 119 |
| Linear Fit | 141 |
| Zero Crime Rate | 137 |

Fig. 6

PREDICTING EDGES IN TEMPORAL NETWORK GRAPHS DESCRIBED BY NEAR-BIPARTITE DATA SETS

BACKGROUND

Generally, analysts manually use a set of tools to determine the most likely future state of a data set that is often described in a very qualitative manner. This can be a time-intensive task both in terms of algorithm development and execution. The general field of predictive analytics is often explored in this context to accomplish such a prediction.

Predictive analytics uses techniques such as regression models, discrete choice models, time series models, etc. with varying levels of success and timelines. For many of these techniques, a situation or collection of interrelated actors/objects is represented as a graph which has well-known ways of being characterized using scalars such as betweenness, centrality, cliques, etc. These graphs are defined as a set of nodes and edges. Many techniques utilize a known pattern of nodes and edges to compared directly with (portions of) the graph to determine a match and recognize a situation. In this approach, the recognition is on current state; there is no capability to match the past of the graph with the present or predict the future of the graph and the algorithm is far from real-time.

However, predictive analytics have at least one of the following shortcomings, e.g., lack scalability, do not consider multiple simultaneous models for evolving the graph, or are brittle, e.g., highly parameterized with hundreds or thousands of parameters.

Accordingly, there is a gap in meeting the current goals of analyzing large data sets. For example, one unmet goal involves the ability to automatically predict the evolution of data sets, e.g., situations, relationships, etc. A variety of techniques are currently employed or being developed that attempt to solve this problem. Some of these techniques include pattern recognition, traditional predictive analytics, evolution of macroscopic and microscopic characteristic scalar properties of network graphs, examination of Internet topology at different times, analysis using graph measures, temporal pattern matching at a node-level, maximum likelihood estimators, e.g., probabilistic predictions, and growing graphs by replicating existing structures and patterns.

BRIEF DESCRIPTION OF THE DRAWINGS

FIG. 1 illustrates a subset of data for analysis to predict a future state of the data according to an embodiment;

FIG. 3 illustrates an alternate representation of the data according to an embodiment;

FIG. 6 shows a comparison chart showing the differences between the method according to an embodiment and other approaches;

DETAILED DESCRIPTION

Figure 2:
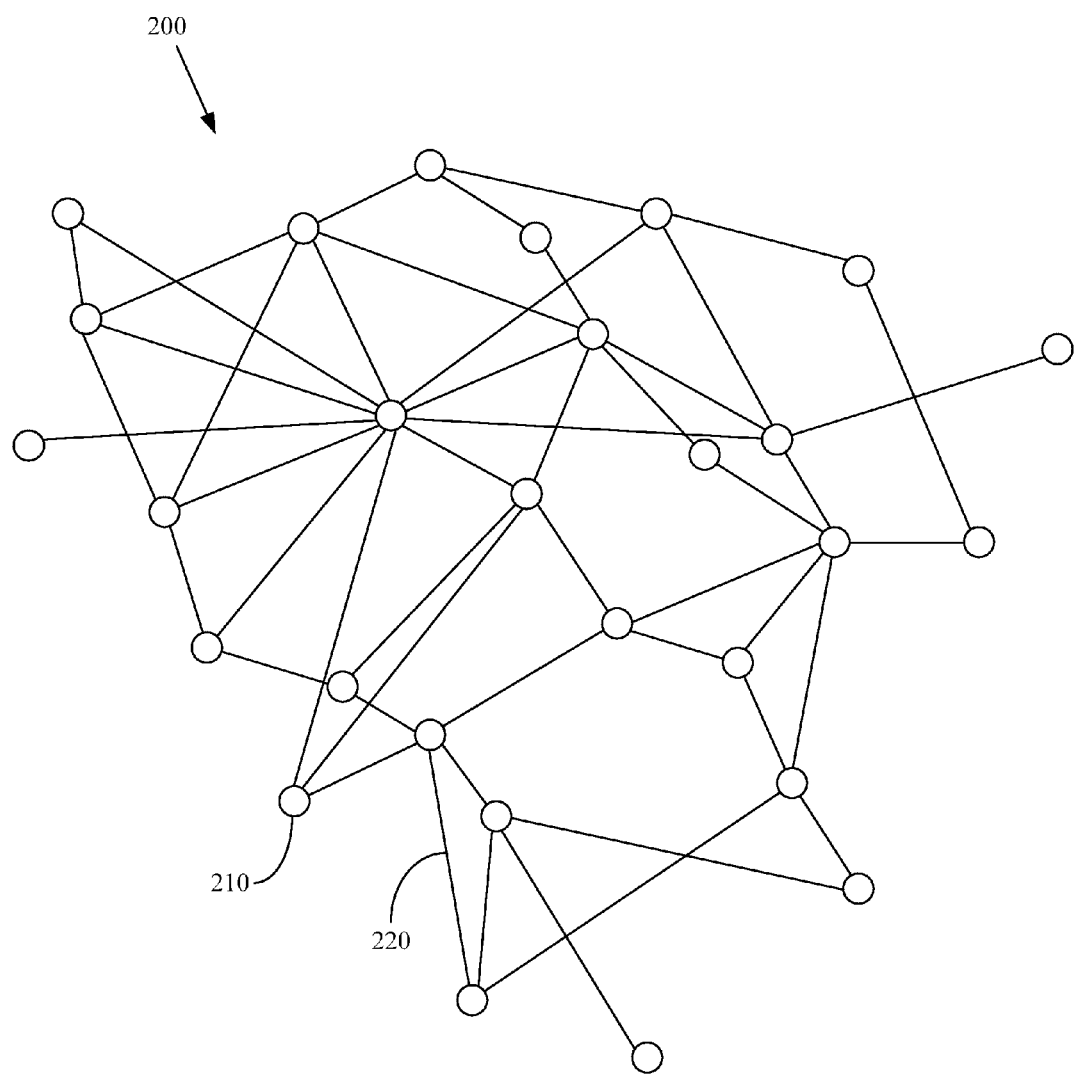
FIG. 2 illustrates a graph of relationships between nodes of interest associated with the data according to an embodiment.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

To predict evolution of graphs, some techniques have calculated macroscopic properties of graphs and include the calculation of characteristic scalar variables and analysis of the values over time. Other techniques use microscopic scalar measures to determine the most likely future state for a node, e.g., marketing analyses that use recency or the length of time since a customer's last purchase to predict a new sale. For this example, a model is developed based on historical data that states that the smaller the value of recency, the greater the probability that the customer will purchase again.

Techniques according to an embodiment are used to provide predictions regarding data. Recursion techniques, for example, may be applied to a particular class of data representations, e.g., the near-bipartite data set. Recursion is useful for estimation and prediction, and is especially useful when applied to large graphs. Multiple prediction models may be considered at once and hybrid models may be identified that fit temporal data. Problems associated with processing large graph while predicting individual node/edge behaviors using time-consuming/uncertain pattern matching algorithms are minimized.

FIG. 1 illustrates a subset of data 100 for analysis to predict a future state of the data according to an embodiment. In FIG. 1, total crime 110 for the year 2011 2012 and for the year 2011 114 across seven areas 120-132, e.g. Areas, districts, etc. is shown. In addition to data regarding total crime 110, data associated with total violent crime 140, total property crime 150 and homicides 160 is also shown. Those skilled in the art will recognize that the data shown in FIG. 1 is merely a subset of possible data and that data used in embodiments may include substantially more data than shown in FIG. 1.

Data such as illustrated in FIG. 1, may be manipulated to create a network graph, G(n, e), with nodes, n, and edges, e. These observational data may include any data that can be represented as nodes and edges such as social network data, logistics data on component failures, financial data, customer relationship data, etc.

FIG. 2 illustrates a graph 200 of relationships (edges) between nodes of interest associated with the data according to an embodiment. In FIG. 2, the nodes 210 represent suspected terrorists. The nodes may be linked to other suspected terrorists that each have contacted, wherein the contacts may be represented by lines 220.

FIG. 3 illustrates an alternate representation of the data 300 according to an embodiment. In FIG. 3, the suspected terrorist 310 are presented in a matrix 320 wherein mutual communication is identified by numbers 330. The actual contacts may be color-coded to visually indicate higher number of contact matches. The data 300 may be mapped into another domain that may provide additional observational or analytical information.

Figure 4:
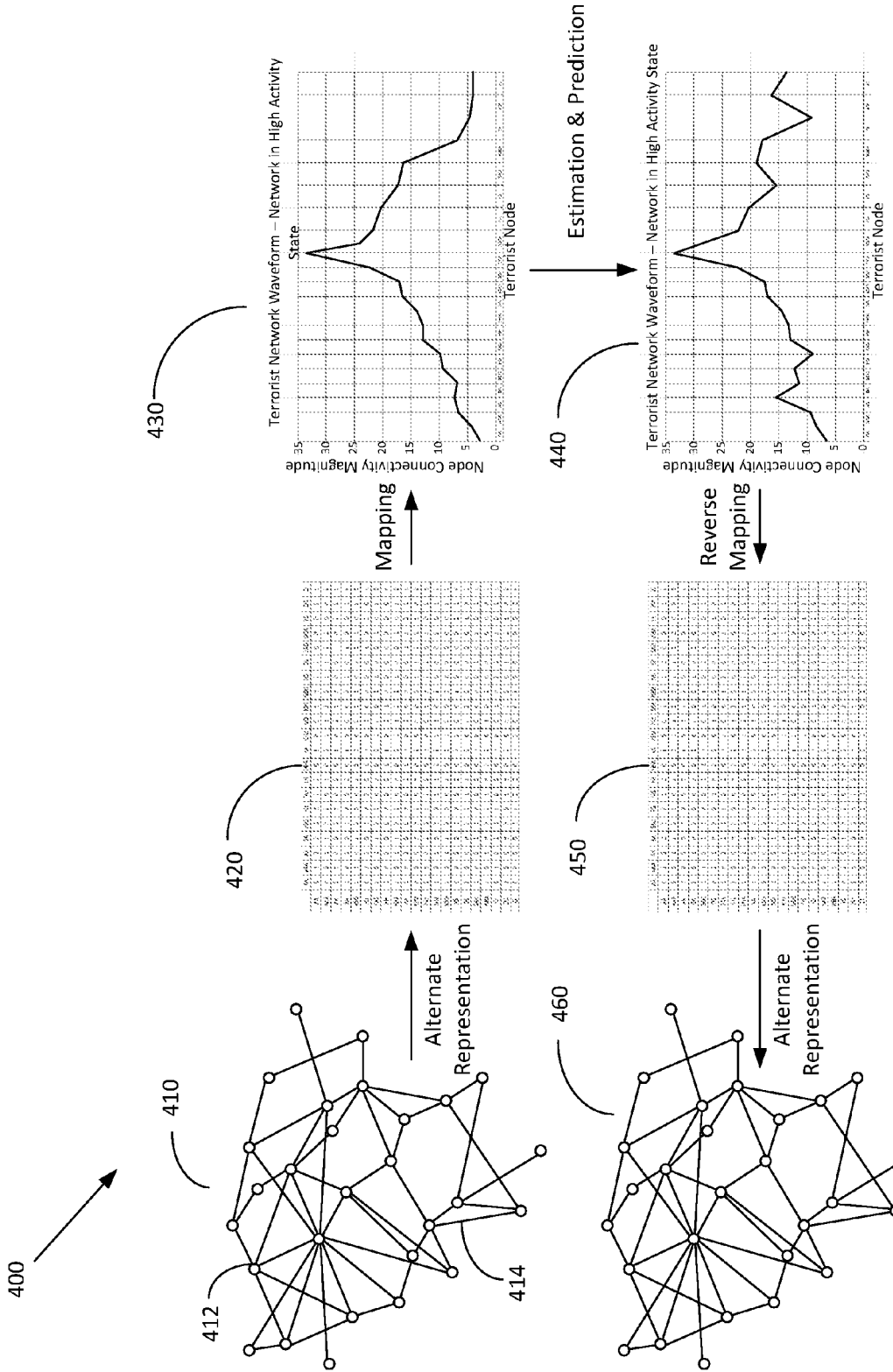
FIG. 4 illustrates a view of the method for predicting a future state of data according to an embodiment.

FIG. 4 illustrates a view of the method 400 for predicting a future state of data according to an embodiment. In FIG. 4, data is provided in a mapping 410 that includes nodes 412 and edges 414 showing the relationship between node elements. The mapping 410 is converted to an alternate representation 420. In FIG. 4, the alternate representation 420 may be an alternate matrix that represents the same data in another format. A waveform 430 is generated based on the alternative mapping 420. The waveform 430 is processed using interacting multiple models (IMM) to derive a predicted waveform 440. The predicted waveform 440 is derived based on an analysis of the data set to characterize one or more underlying models for the data, e.g., using Fourier transforms. The predicted waveform 440 is then reverse mapped to an alternate representation 450, which is in a different domain. In FIG. 4, the alternate representation 450 may be an alternate matrix.

There are many techniques for mapping a network graph to different domains, including using such measures as centrality, connectivity, shortest path, etc. A predicted network map 460 may be obtained from the alternate matrix representation by reversing the process. The estimation and prediction used to process the original waveform 430 to produce the predicted waveform 440 may include the use of recursion methods to increase the ability to process high data loads. For example, Kalman Filter equations are one recursion method to provide an estimate. To increase effectiveness, e.g., improve predictive accuracy, multiple predictions models may be considered at once.

For example, Fourier transforms may be used to analyze the data and drive the characteristics of the prediction models. Kalman filters are applied to the different prediction models characterized by the Fourier transforms. The different models are applied to provide a prediction for each. The predictions are compared. If three prediction models are used, each prediction model uses its own Kalman filter, and each Kalman filter generates its own estimate and its own prediction. The IMM framework provides for multiple models by allowing distinct prediction models for each of the underlying prediction models. The IMM combines the predictions in an optimal fashion to get the best match and automatically generates a measure of uncertainty in the match, e.g., the best match may be to use 50% of prediction model A, 25% of prediction model B and 25% of prediction model C, which is determined to have a 95% confidence rationale for that match.

Figure 5A:
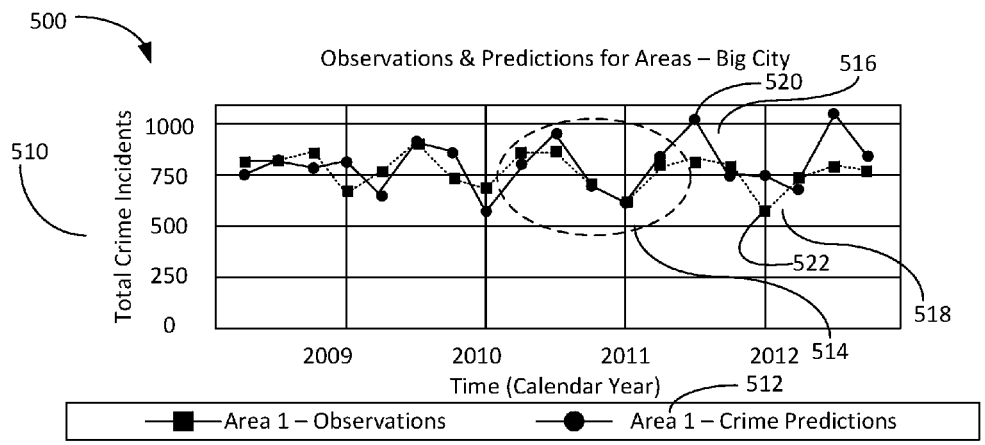
FIG. 5a-c illustrates the results of predictions for several nodes according to an embodiment.
Figure 5B:
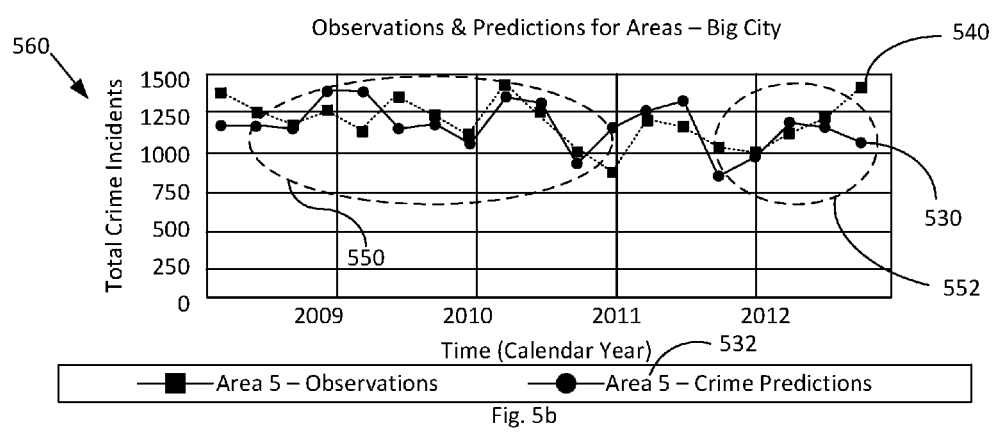
Figure 5C:
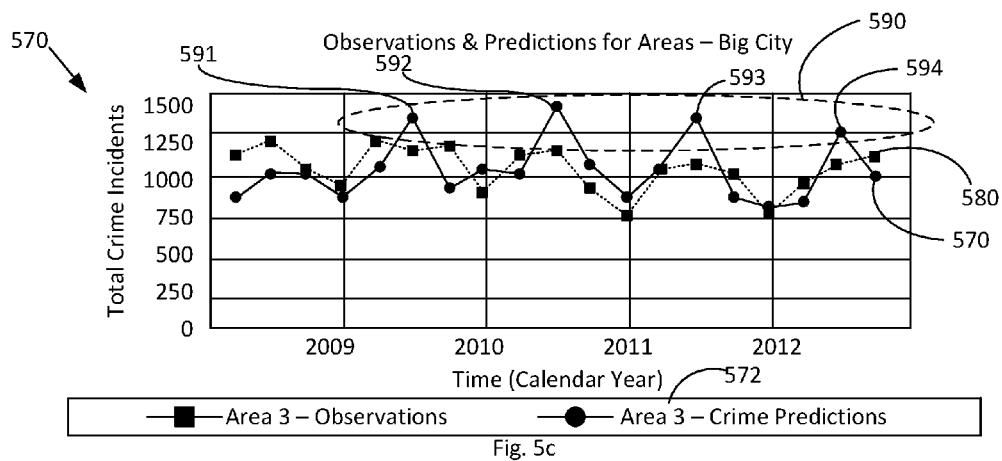

FIG. 5a-c illustrates graphs 500, 560, 570 of predictions for several nodes according to an embodiment. In FIGS. 5a-c, crime data are aggregated by quarter (in 3 month intervals), thus the prediction time is 3 months. FIG. 5a is a graph 500 showing the results of crime predictions versus observations for Area-1 512 according to an embodiment. The actual crimes in that quarter for the year 510 are shown by line 1 520. Line 2 522 represents the predictions that take into account data from prior quarters. FIG. 5a shows the results for Area-1 512 and shows good agreement between predictions line 2 522 and actual data represented by line 1 520, especially in 2010 514.

FIG. 5b is a graph 560 showing the results of crime predictions for Area-5 according to an embodiment. FIG. 5b shows the predictions 530 in Area-5 532 resulting from the automated adaptive model parameter adjustments according to an embodiment. The actual crimes are shown for each quarter of the year by line 1 540. The predictions, which are based on data from prior quarters, are shown by line 2 530. For Area-5 532, more than half of the predictions 550, 552 have little difference when compared to truth (observed data).

FIG. 5c is a graph 500 showing the results of crime predictions for Area-3 according to an embodiment. FIG. 5c shows the predictions for Area-3 572, which are the most challenging. In FIG. 5c, the actual crimes per quarter are shown by line 1 580. Line 2 570 represents the predictions that take into account data from prior quarters.

FIG. 6 shows a comparison chart 600 that describes results comparing different methods according to an embodiment and other approaches. In FIG. 6, each method 610 is shown with an associated average error versus truth (observed data) 620. The IMM method 630 according to an embodiment, which may also be referred to herein as the CAPPING (capability for prediction in network graphs) method, produces an average error versus the truth or actual observed crimes having a 119 value 640. The linear fit 632 produces an average error versus the truth (observed) having a 141 value 642. The zero crime rate method 634 produces an average error versus the truth (observed) having a 137 value 644. The zero crime rate method 634 bases predictions on the previous months' data, i.e., next month's crime rate will be the same as the previous month's crime rate. The linear fit approach 632 fits data prior to the predicted time to a linear least squares fit. The errors are average differences between the prediction and truth for quarters (times) and across Areas. Accordingly, there is a 17% improvement from the IMM method 630 over the linear fit method 632 and a 13% improvement from the IMM method 630 over the zero crime rate method 634.

Figure 7:
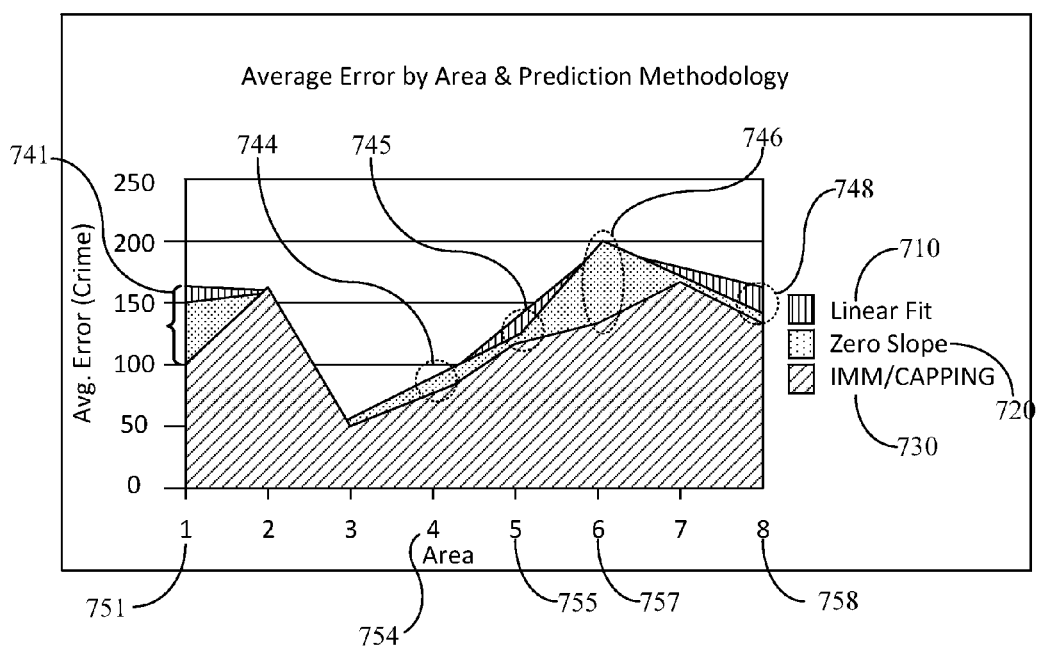
FIG. 7 is a graph showing the average error by Area and prediction methodology according to an embodiment.

FIG. 7 is a graph 700 showing the average error by Area and prediction methodology according to an embodiment. FIG. 7 shows a contrast in the errors from linear fit 710, zero slope crime rate 720, and the IMM or CAPPING method 730 according to an embodiment. Significant improvement 741, 746 is seen for the IMM method 730 compared to the others for Area-1 751 and Area-6 756, with moderate improvements 744, 745, 748 for Area-4 754, Area-5 755, and Area-8 758. In the Areas, including Area-1 751, Area-4 754, Area-5 755, Area-6 756 and Area-8 758, the average error for the IMM method 730 is less than or equal to that of the other approaches, i.e., the linear fit 710 and the zero slope crime rate 720 methods.

In addition to the main benefit of predicting a network graph, and its underlying relationships between nodes, into the future, an analyst has the opportunity to recognize how the network graph might be perturbed in order to effect changes. For example, if a network graph is predicted to depart from the model norm, then determinations could be made on how to return the graph back to a norm by examining the nature of the departure points. The result of such an examination/analysis may provide input to a course of action development process. In this way, this proposed capability drives application of effects to target outcomes.

The IMM method 730 according to an embodiment also has the potential to inherently drive the definition of new predictive models by automatically considering hybrids of existing predictive models. When predictions match a particular hybrid model with enough frequency, the hybrid model may become its own distinct model and replace other models that are used less frequently. In this way, the algorithm may automatically aid an analyst in adapting to evolving enemy tactics.

This capability has the potential to positively impact domains such as social network analysis, cyber-warfare and protection, infrastructure protection, failure prediction prognostics in logistics, revenue prediction, etc. by enhancing network graph analysis via reduced analysis time.

Figure 8:
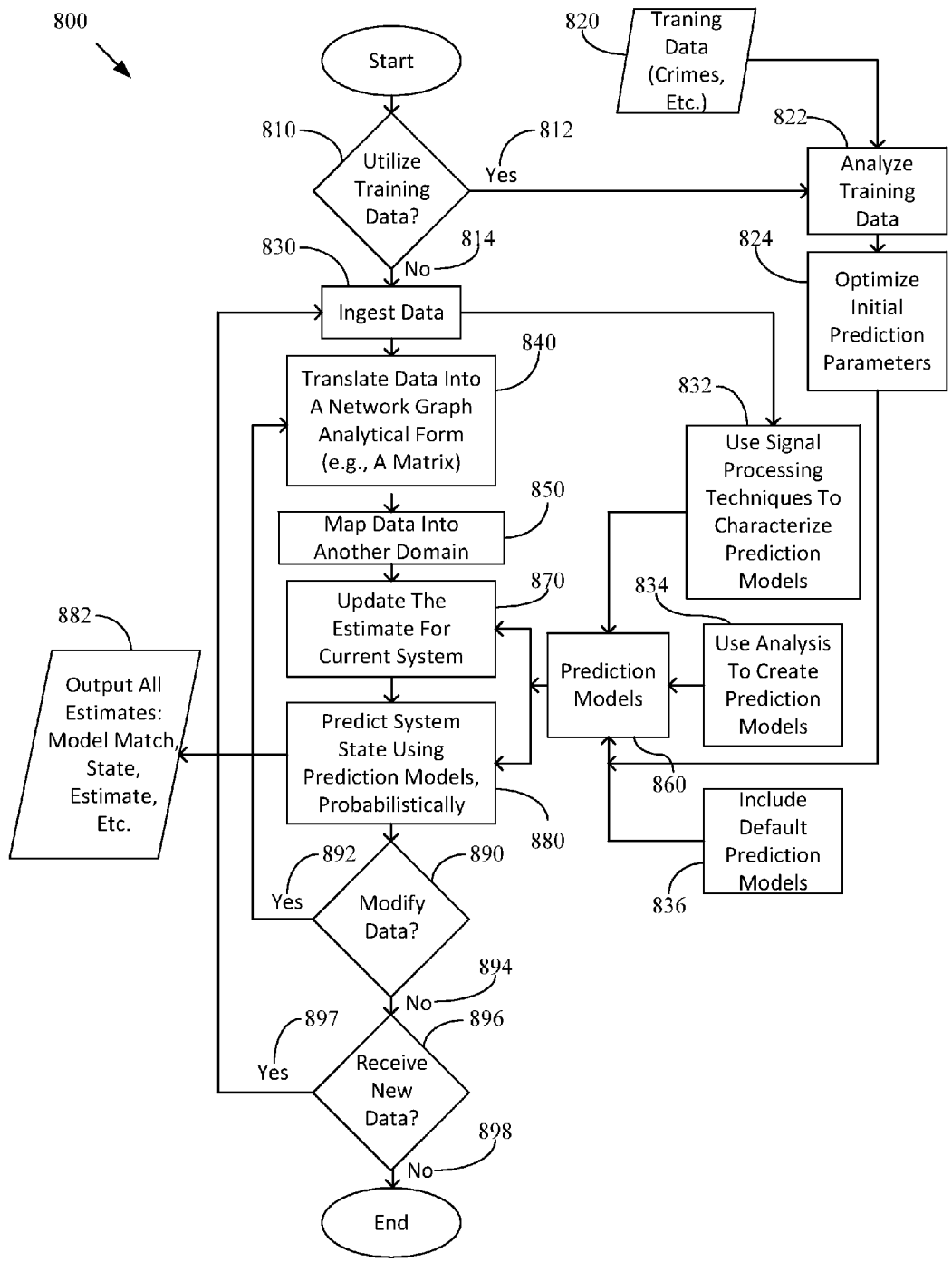
FIG. 8 illustrates a flowchart of a method for predicting a future state of data according to an embodiment.

FIG. 8 illustrates a flowchart 800 of a method for predicting a future state of data according to an embodiment. In FIG. 8, a determination is made whether training data is available. If yes 812, the training data is analyzed 822. Training data 820 may be provided for analysis 822. If no 814, training data is ingested 830. Signal processing techniques may be used to characterize prediction models 832. The characterization of the prediction models is provided to one or more prediction models 860. Analysis may be used 834 to create prediction models 860. Default prediction models may be included 836. After the training data is analyzed 822, the initial prediction parameters are optimized 824. The optimized prediction parameters are provided to the prediction models 860.

After data is ingested 830, the data may be translated into a network graph analytical form, e.g., a matrix 840. The data is then mapped into another domain 850. The data mapped into another domain 850 is used, along with prediction models 860, to update an estimate for the current system 870. A system state is predicted 880 using the prediction models 860, e.g., probabilistically. All estimates, model matches, states, estimates, etc. are provided as output 882.

A determination is made whether to modify the data 890. If yes 892, the process returns to translate the data into a network graph analytical form 840. If no 894, a determination is made whether new data has been received 896. If yes 897, the process returns to ingest data 830. If no 898, the process terminates.

Figure 9:
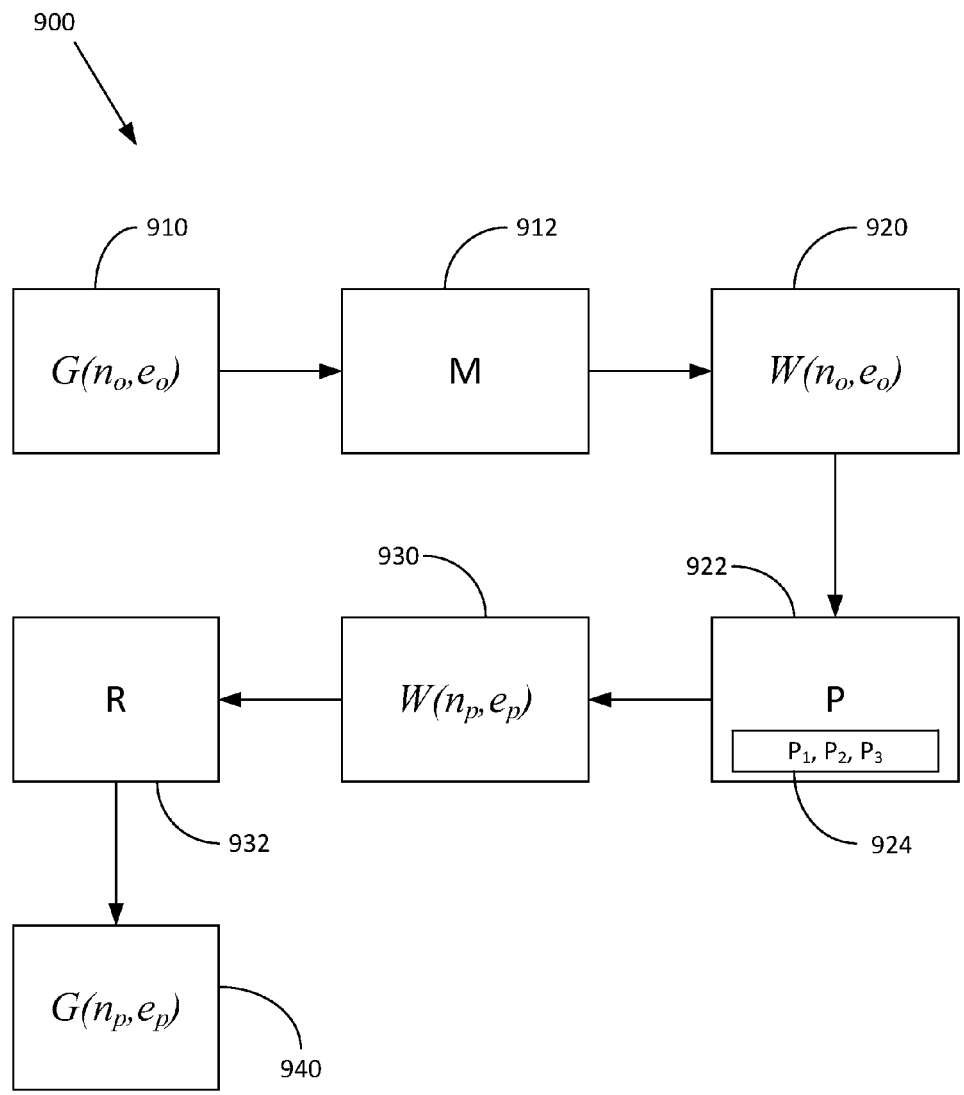
FIG. 9 illustrates a flow diagram of a mathematical technique for predicting a future state of data according to an embodiment.

FIG. 9 illustrates a flow diagram 900 of a mathematical technique for predicting a future state of data according to an embodiment. FIG. 9 shows mapping of observational data, $G(n_o, e_o)$ 910, into another domain, $W(n_o, e_o)$ 920, with M 912: $G(n_o, e_o) \rightarrow W(n_o, e_o)$. In the new domain, W, the data may be more easily manipulated using particular calculations and techniques. After application of at least one prediction model, P 922: $W(n_o, e_o) \rightarrow W(n_p, e_p)$, the predicted state, $W(n_p, e_p)$ 930, is then reverse mapped back to the original domain with R 932: $W(n_p, e_p) \rightarrow G(n_p, e_p)$, the predicted data $G(n_p, e_p)$ 940.

It is expected that not every mapping, M 912, will allow a reverse mapping, R 932, back to the original domain, but priority is given to those that do. In addition, the use of multiple prediction models, $P_i$ 922, along with a calculation of the level of match of observational data to the different models can be interpreted as a measure of recognition of the current situation. A quantitative measure of confidence may also be provided.

Techniques such as block-modeling or role assignment may be used to reduce the complexity of a large graph and make it more tenable for manipulation. However, this procedure could hide at least some details of the network graph, yet may allow faster insights where none were available before.

The selection of predictive models is one of the challenges to predictive modeling. Ordinarily models may be chosen based on known models according to behavior, depending on what is to be recognized and predicted as well as the nature of the data. Prediction model development may use a couple of models combined with an analysis of the data set to create one or more underlying models. The comparison between the prediction and actual evolution of the graph is a measure of effectiveness.

Selection of mapping techniques is also a challenge. There is likely no mapping that is best suited for all graphs or data sets. It is expected that the particular mapping technique used will be driven both by the data composing the graph and also how the data is represented in the graph, $G(n_o, e_o)$ 920. Note that the suitability of the measure for the reverse mapping, R 932, is also considered when choosing a mapping technique, M 932.

In addition, it is difficult to find open source data sets that are sufficiently well-behaved to validate results of prediction models. However, a crime data set may be used due to its availability and its representation of real world characteristics, i.e., noisy data. Other interesting data sets include communications data between individuals or other indications of relationships between individuals such as indications of meetings (from HUMINT, IMINT, etc.) or job-related organizational structure. Herein, Washington, D.C. crime data set will be used to illustrate embodiments due to its availability and its representation of real world characteristics including noisy data.

Mapping, M 912, may be accomplished many ways. For example, a simple function that aggregates the raw data into bins may be used. Three prediction models may be developed and incorporated simultaneously as the prediction functions, $P_1$, $P_2$, and $P_3$ 924. For the Washington, D.C. crime data set, a graph will exhibit an edge that appears between the crime node and an Area/location node when a crime occurs in that Area.

Figure 10:
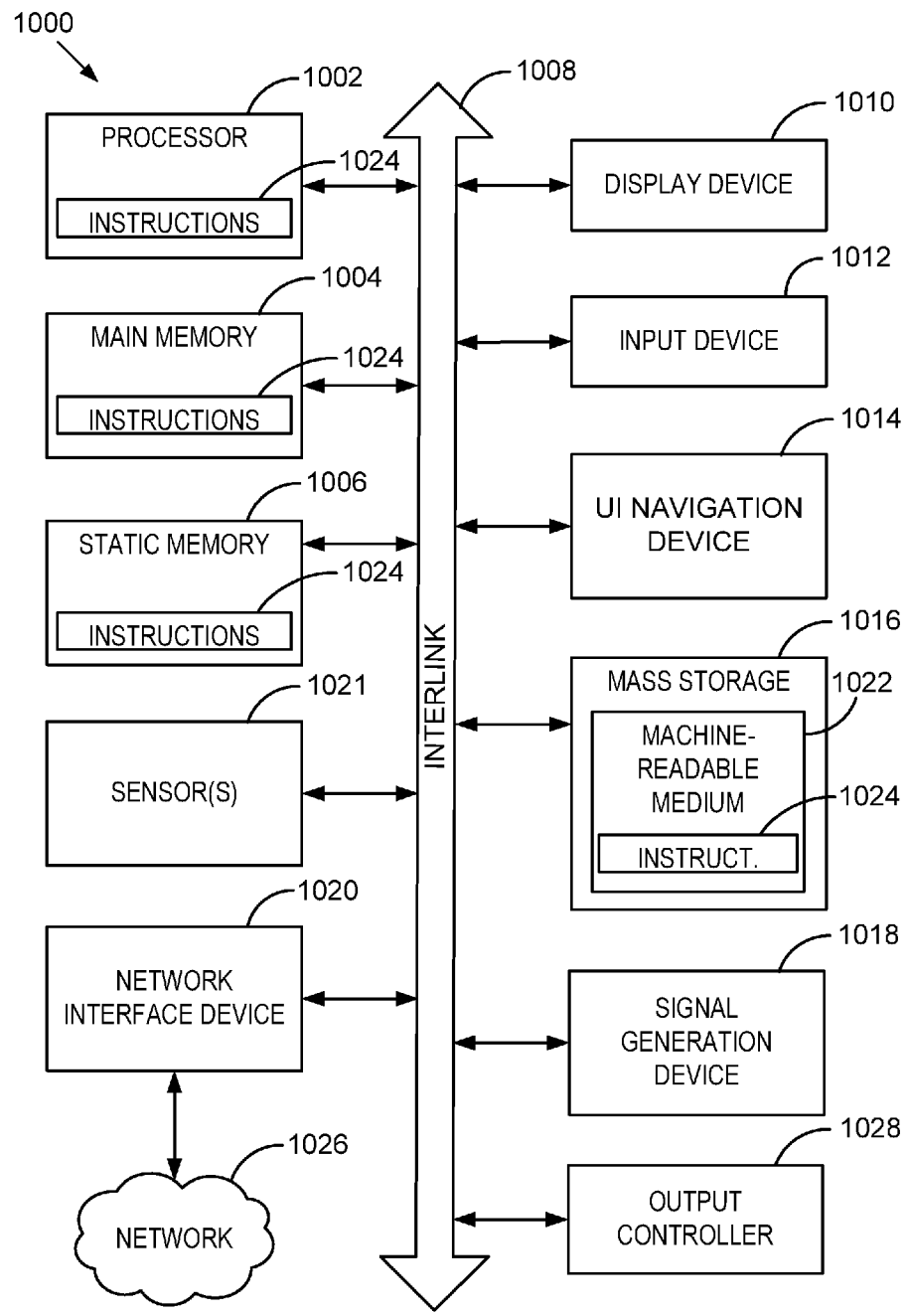
FIG. 10 illustrates a block diagram of an example machine for predicting a future state of data according to an embodiment.

FIG. 10 illustrates a block diagram of an example machine 1000 for predicting a future state of data according to an embodiment upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine and/or a client machine in server-client network environments. In an example, the machine 1000 may act as a peer machine in peer-to-peer (P2P) (or other distributed) network environment. The machine 1000 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 1002 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 1002 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multi-processor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, at least some of which may communicate with others via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR)) connection to communicate or control one or more peripheral devices (e.g., a printer, card reader, etc.).

The storage device 1016 may include at least one machine readable medium 1022 on which is stored one or more sets of data structures or instructions 1024 (e.g., software) embodying or utilized by any one or more of the techniques or functions described herein. The instructions 1024 may also reside, at least partially, additional machine readable memories such as main memory 1004, static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) that configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for predicting a future state of a set of data, comprising:
   obtaining a set of data in a first domain;
   mapping the set of data into a second domain;
   applying a plurality of prediction models to the set of data in the second domain to produce a plurality of predicted sets of data including applying a Fourier transform to characterize each of the plurality of prediction models;
   combining the predicted sets of data to generate a combined predicted set of data having a best match; and
   reverse mapping the combined predicted sets of data having the best match to the first domain.

2. The method of claim 1, wherein the applying the plurality of prediction models to the set of data in the second domain further comprises applying an Interacting Multiple Models (IMM) approach with a plurality of prediction models to produce a plurality of predicted sets of data in the second domain.

3. The method of claim 1, wherein the combining the predicted sets of data to generate a combined predicted set of data having a best match further comprises generating a measure of uncertainty associated with the combined predicted set of data having a best match.

4. The method of claim 1 further comprising calculating a level of match of the set of data in the first domain to the predicted set of data to determine a measure of recognition of a situation associated with the set of data in the first domain.

5. The method of claim 1 further comprising quantifying a measure of confidence of a match between the set of data in the first domain and the predicted set of data.

6. The method of claim 1, wherein the mapping the set of data in the first domain comprises applying a function to the set of data in the first domain that aggregates the set of data in the first domain.

7. The method of claim 1 further comprising representing the set of data in the first domain as a network of nodes and edges and wherein the applying the plurality of prediction models to the set of data in the second domain to produce a plurality of predicted sets of data further comprises applying at least one prediction model to the set of data in the second domain to predict an evolution of the network representing the set of data in the first domain.

8. A device for predicting a future state of a set of data, comprising:
   an input device for providing a set of data in a first domain;
   memory, coupled to the input device, for storing the set of data in the first domain;
   a processor, coupled to the memory, the processor arranged to:
      mapping the set of data into a second domain;
      applying a plurality of prediction models to the set of data in the second domain to produce a plurality of predicted sets of data including applying a Fourier transform to characterize each of the plurality of prediction models;
      combining the predicted sets of data to generate a combined predicted set of data having a best match; and
      reverse mapping the combined predicted sets of data having the best match to the first domain.

9. The device of claim 8, wherein the processor is further arranged to apply an Interacting Multiple Models (IMM) approach with a plurality of prediction models to produce a plurality of predicted sets of data in the second domain.

10. The device of claim 8, wherein the processor is further arranged to generate a measure of uncertainty associated with the combined predicted set of data having a best match.

11. The device of claim 8, wherein the processor is further arranged to calculate a level of match of the set of data in the first domain to the predicted set of data to determine a measure of recognition of a situation associated with the set of data in the first domain.

12. The device of claim 8, wherein the processor is further arranged to apply a function to the set of data in the first domain that aggregates the set of data in the first domain.

13. The device of claim 8, wherein the processor is further arranged to represent the set of data in the first domain as a network of nodes and edges and to apply at least one prediction model to the set of data in the second domain to predict an evolution of the network representing the set of data in the first domain.

14. At least one non-transitory machine readable medium comprising instructions that, when executed by the machine, cause the machine to perform operations for predicting a future state of a set of data, the operations comprising:
   obtaining a set of data in a first domain;
   mapping the set of data into a second domain;
   applying a plurality of prediction models to the set of data in the second domain to produce a plurality of predicted sets of data including applying a Fourier transform to characterize each of the plurality of prediction models;
   combining the predicted sets of data to generate a combined predicted set of data having a best match; and
   reverse mapping the combined predicted sets of data having the best match to the first domain.

15. The at least one non-transitory machine readable medium of claim 14, wherein the applying the plurality of prediction models to the set of data in the second domain further comprises applying an Interacting Multiple Models (IMM) approach with a plurality of prediction models to produce a plurality of predicted sets of data in the second domain.

16. The at least one non-transitory machine readable medium of claim 14, wherein the combining the predicted sets of data to generate a combined predicted set of data having a best match further comprises generating a measure of uncertainty associated with the combined predicted set of data having a best match.

17. The at least one non-transitory machine readable medium of claim 14, further comprising calculating a level of match of the set of data in the first domain to the predicted set of data to determine a measure of recognition of a situation associated with the set of data in the first domain.

* * * * *